(12) United States Patent
Kurlander et al.

(10) Patent No.: US 7,467,353 B2
(45) Date of Patent: Dec. 16, 2008

(54) AGGREGATION OF MULTI-MODAL DEVICES

(75) Inventors: David J. Kurlander, Seattle, WA (US); Yuan Kong, Kirkland, WA (US); David W. Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 11/261,107

(22) Filed: Oct. 28, 2005

(65) Prior Publication Data

US 2007/0101274 A1    May 3, 2007

(51) Int. Cl.
G06F 15/00 (2006.01)
G06F 13/00 (2006.01)

(52) U.S. Cl. ............................... 715/744; 715/864
(58) Field of Classification Search ......... 715/744–747, 715/864–866, 762–765, 853; 709/227–228
See application file for complete search history.

(56) References Cited

U.S. PATENT DOCUMENTS

| | | | |
|---|---|---|---|
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,812,865 A | 9/1998 | Theimer et al. |
| 6,466,232 B1 | 10/2002 | Newell et al. |
| 6,513,046 B1 | 1/2003 | Abbott, III et al. |
| 6,549,915 B2 | 4/2003 | Abbott, III et al. |
| 6,747,675 B1 | 6/2004 | Abbott et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,842,877 B2 | 1/2005 | Robarts et al. |
| 7,174,361 B1 * | 2/2007 | Paas .......................... 709/203 |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |

(Continued)

FOREIGN PATENT DOCUMENTS

WO        9800787        1/1998

OTHER PUBLICATIONS

Andy Harter, et al., A Distributed Location System for the Active Office, IEEE Network, 1994, pp. 67-70.

(Continued)

Primary Examiner—Kevin Nguyen
(74) Attorney, Agent, or Firm—Amin, Turocy & Calvin, LLP

(57) ABSTRACT

A system that facilitates consolidating resources (e.g., devices, services) based at least in part upon an established context. More particularly, a context determination component can be employed to establish a context by processing sensor inputs or learning/inferring a user action/preference. Once the context is established via a context determination component, a consolidation component can be employed to aggregate and/or disaggregate disparate resources (e.g., devices, services) in accordance with the established context. These resources can work autonomously and/or in conjunction with a subset of the other resources to provide for a highly rich multi-modal user experience.

20 Claims, 11 Drawing Sheets

U.S. PATENT DOCUMENTS

| | | | |
|---|---|---|---|
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1* | 3/2003 | Abbott et al. ............... 709/228 |
| 2003/0154476 | A1 | 8/2003 | Abbott, III et al. |
| 2005/0034078 | A1 | 2/2005 | Abbott et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings Usenix Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

AGGREGATION OF MULTI-MODAL DEVICES

BACKGROUND

Both enterprises and individuals are increasingly interested in using handheld devices. Most modern handheld devices are equipped with multiple sensors (e.g., microphone, wireless transmitter, global positioning system (GPS) engine, camera, stylus, etc.). However, there are no applications available that make full use of multiple sensors. In other words, multi-sensory technologies that make handheld devices a multi-modal multi-lingual mobile assistant are not available.

Today, portable devices such as cellular telephones and personal data assistants (PDAs) employ state-of-the-art operating systems. As such, these devices have increased computing power in hardware and increased features in software in relation to earlier technologies. Oftentimes, cellular telephones are equipped with built-in digital image capture devices (e.g., cameras) and microphones together with computing functionalities of personal digital assistants (PDAs). Since these devices combine the functionality of cellular telephones with the functionality of PDAs, they are commonly referred to as "smart-phones." The hardware and software features available in these smart-phones and similar technologically capable devices provide developers the capability and flexibility to build applications through a versatile platform. The increasing market penetration of these portable devices (e.g., PDAs) inspires programmers to build applications, games, etc. for these smart-phones.

Conventionally, these portable devices (e.g., smart-phones, PDAs) do not integrate well with a desktop computer. For example, although smart-phones and PDAs are frequently equipped with image capture devices, this functionality is not currently integrated into a computer or disparate device thereby enabling a collaborated and/or aggregated use of this functionality.

Electronic organizers are widely used to manage and organize a variety of PIM (personal information manager) data. An electronic organizer (e.g., PIM) enables a user to electronically retain personal data for any purpose and to retrieve the data as desired. Today, PIMs can vary widely, but common to all of them is to provide methods for managing and organizing personal information and to make the information readily available to the user.

Other technologically advanced devices continue to emerge thereby assisting a user in advanced functionality. For example, sunglasses equipped with digital music capability have recently emerged into today's marketplace. These digitally-capable eyewear products are equipped with a digital audio engines thus enabling a user to eliminate wires used with conventional digital headphone/player combinations.

Systems do not currently exist that provide for automatic collaboration, synchronization and/or aggregation of data and services between multiple devices. Furthermore, conventional systems and devices do not leverage the increased computing power of portable devices and PCs by automatically facilitating data and service synchronization and/or collaboration. In other words, devices that enable wireless synchronization and collaboration of data and services between disparate devices are not currently available.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system that facilitates consolidating resources (e.g., devices, services) based at least in part upon an established context. More particularly, a context determination component can be employed to establish a context by processing sensor inputs or learning/inferring a user action/preference. Once the context is established via context determination component, a consolidation component can be employed to aggregate disparate resources (e.g., devices, services) in accordance with the established context.

In another aspect, the system can monitor the context thereby maintaining an appropriate aggregation of resources. In other words, the system can automatically and/or dynamically disaggregate resources based upon changes in context information. In still other aspects, the system can analyze a current aggregation based upon availability of additional resources.

In accordance with yet another specific example, devices (e.g., resources) can include a watch, an earphone, a power source in a shoe, a cellular telephone, sunglasses, an embedded global position system (GPS), an accelerometer, a personal data assistant (PDA), a camera, wired attire, etc. Based upon a context determination, these devices can be aggregated and/or disaggregated in accordance with the current context or anticipated changed in the context.

In yet another aspect of the subject invention, the each of the disparate devices can be employed autonomously and/or in conjunction with a subset of the other devices in order to provide a highly rich multi-modal user experience based solely upon a user state. This pooling of devices can be based upon any predetermined context. Moreover, the exemplary aspect can automatically and dynamically disaggregate resources (e.g., devices, services) based upon the user state.

In yet another aspect thereof, an artificial intelligence (AI) component and/or learning/reasoning component is provided that employs a probabilistic and/or statistical-based analysis to prognose or infer a user context. Additionally, this AI component can be employed to automatically join and/or disjoin resources based upon an prediction and/or inference.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
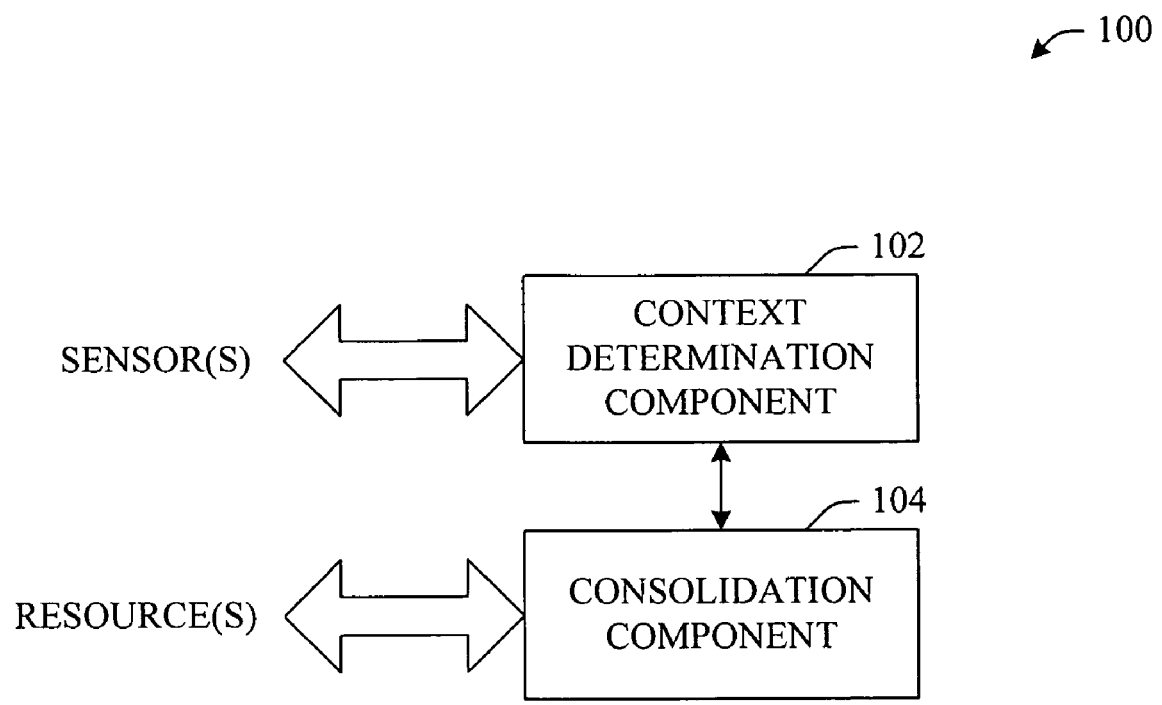
FIG. 1 illustrates a system that facilitates consolidating context aware resources in accordance with an aspect of the novel innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates consolidating resources based at least in part upon an established context. Generally, system 100 can include a context determination component 102 and a consolidation component 104. In operation, these components (102, 104) can establish a context by processing sensor inputs. Once the context is established via context determination component 102, the consolidation component 104 can be employed to aggregate disparate resources (e.g., devices, services) in accordance with the established context.

More particularly, various devices can be situated at disparate locations and thereafter combined (e.g., consolidated, aggregated) in accordance with a determined user context. By way of example and not limitation, devices can include a watch, an earphone, a power source in a shoe, a cellular telephone, sunglasses, an embedded global position system (GPS), an accelerometer, a personal data assistant (PDA), a camera, wired attire, etc. These, and other examples, will be described in greater detail infra with respect to the novel functionality of the aggregation/disaggregation system disclosed and claimed herein. It is to be understood and appreciated that other aspects exist that employ the novel functionality to pool or consolidate additional or different types of devices. These additional aspects are to be considered a part of this disclosure and claims appended hereto.

In an aspect of the subject system 100, each of the disparate devices can be employed autonomously and/or in conjunction with a subset of the other devices in order to provide a highly rich multi-modal user experience. As described above, this pooling of devices can be based upon a predetermined context. Additionally, in other aspects, the system 100 can automatically and dynamically disaggregate resources (e.g., devices, services) in accordance with a present context.

Figure 2:
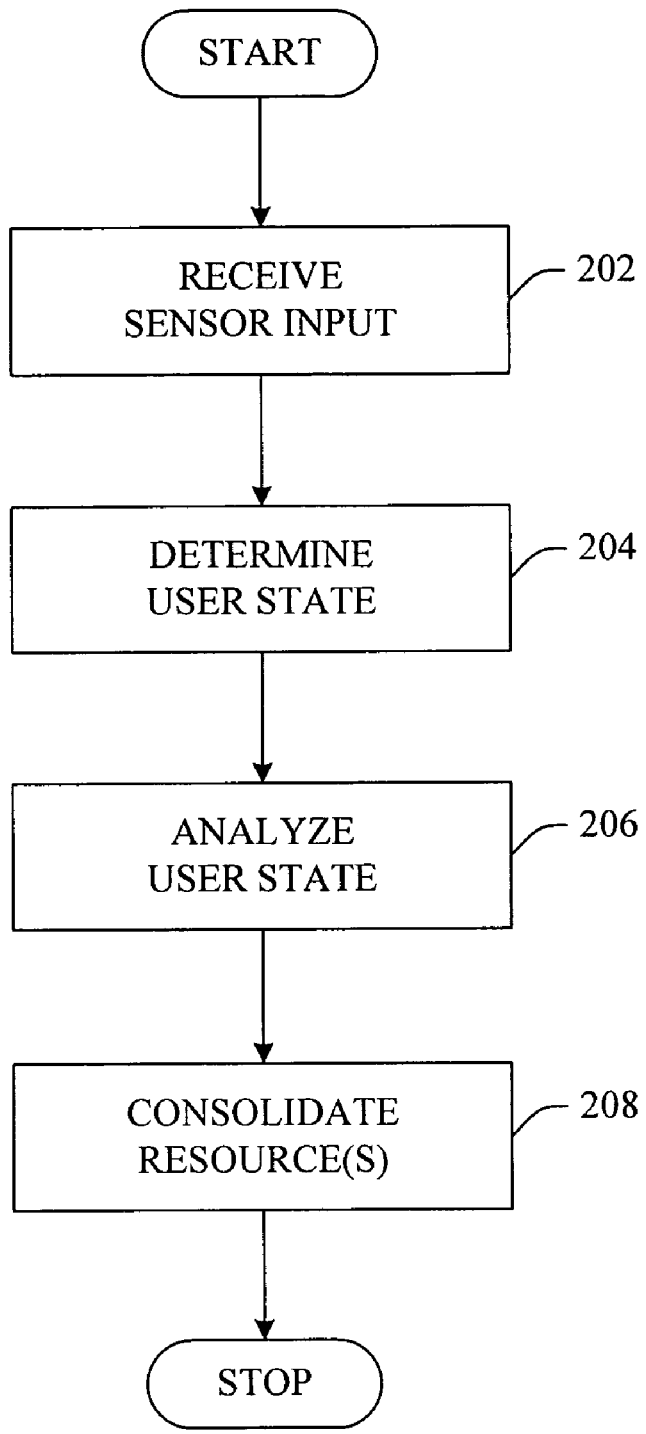
FIG. 2 illustrates an exemplary flow chart of procedures that facilitate consolidating resources based upon a user state in accordance with an aspect of the claimed subject matter.

Turning now to FIG. 2, there is illustrated a methodology of consolidating resources in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, a sensor input is received. As will be better understood upon a review of the figures that follow, a system can receive an input from any type of sensor (e.g., physiological, environmental). Moreover, in yet other aspects, the system can inquire a user and/or application for information/data by which a context can be established. In still other aspects, information/data can be automatically input directly thereafter enabling establishment of a context.

Returning to the example of FIG. 2, once an input (or group of inputs) is received at 202, a user state (e.g., context) can be established at 204. Although the methodology of FIG. 2 describes an act of determining a user state, it will be appreciated that the novel functionality of the subject systems and methodologies can employ other contexts (e.g., environmental, location, temporal) without departing from the scope of this disclosure and claims appended hereto.

At 206, the user state can be analyzed with respect to available resources (e.g., devices, services). Thereafter, at 208, all, or a subset of, available resources can be consolidated thereby providing a rich user experience with respect to the user state (e.g., context).

Figure 3:
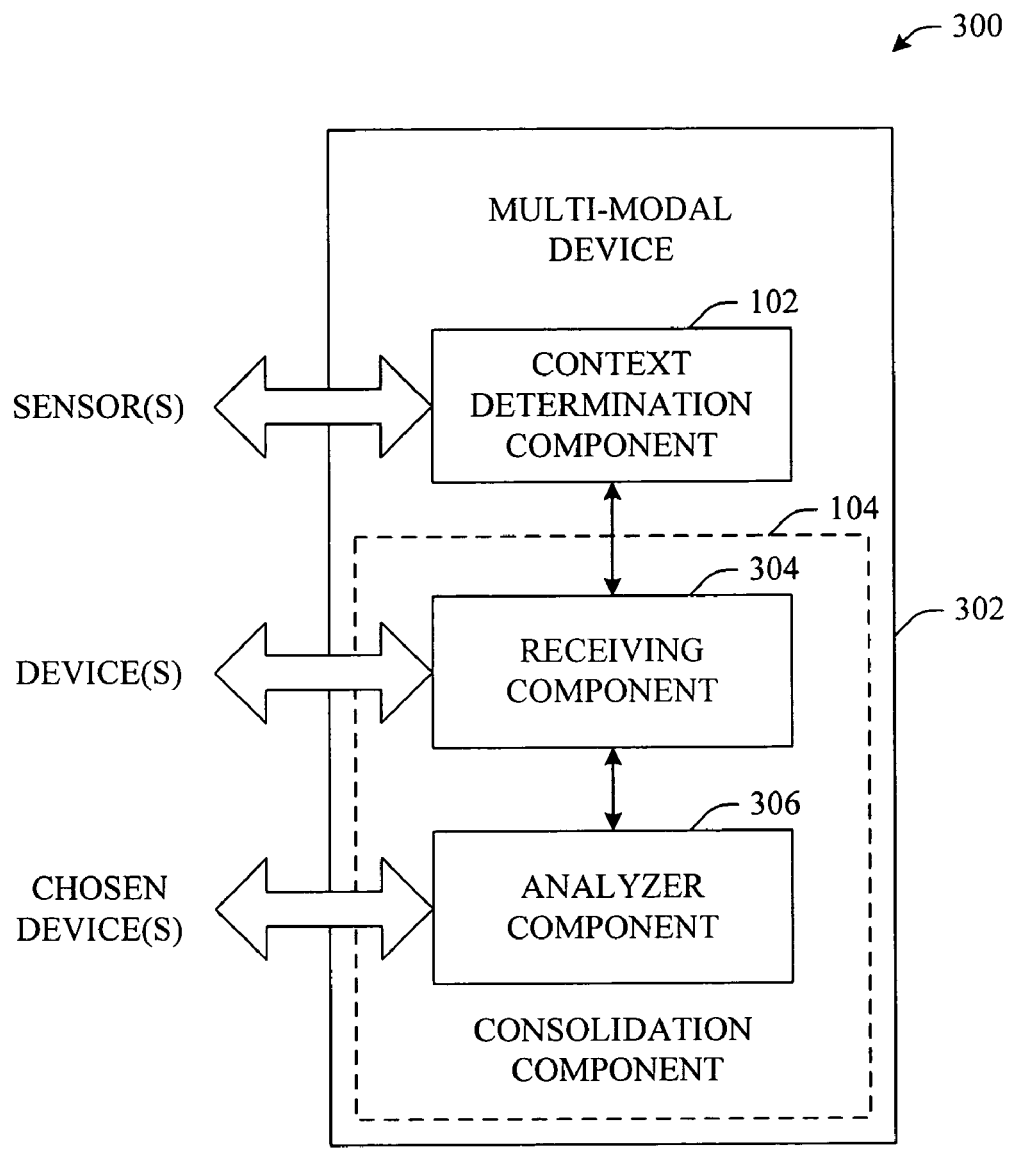
FIG. 3 illustrates a block diagram of a multi-modal device that facilitates analyzing a context and consolidating devices based upon the context in accordance with an aspect of the innovation.

FIG. 3 illustrates yet another exemplary system 300 that incorporates novel functionality of aggregating resources into a multi-modal device 302. For example, the multi-modal device 302 can be a PDA, smart-phone, cellular phone, pocket computer, personal music player or the like. Although FIG. 1 illustrates a novel system 100 that can facilitate aggregation/disaggregation of resources (e.g., devices, services), it is to be appreciated, as shown in FIG. 3, that the novel functionality can be incorporated into any device thereby effecting consolidation (e.g., aggregation) of individual devices (e.g., 302). In other words, the novel aggregation functionality can be incorporated into individual devices and/or into a specific function device. This specific device 302 can serve as a master device that pools functionality from disparate devices based upon a defined and/or determined context.

FIG. 3 illustrates a block diagram of multi-modal device 302 having a context determination component 102 and a consolidation component 104 included therein. More particularly, multi-modal device 302 can include a context determination component 102 and a consolidation component 104. As shown, the consolidation component 104 can include a receiving component 304 and an analyzer component 306.

As described supra, the context determination component 102 can be employed to establish a user context (e.g., state), environmental context, location context, temporal context, etc. Once established, the context factors can be input into the receiving component 304. As well, the receiving component 304 can communicate with disparate devices in order to determine available devices. This communication is illustrated in FIG. 3 by the two-way arrow from receiving component 304 to devices.

The receiving component 304 can communicate the context information received from the context determination component 102 as well as the available device information to the analyzer component 306. In turn, the analyzer component 306 can determine which, if any, of the available devices should be employed with respect to the context. Accordingly, the analyzer component 306 can choose appropriate devices based upon the present context.

In other examples, the analyzer component 306 can dynamically monitor the context, via receiving component 304, thereafter automatically modifying (e.g., disaggregating) the chosen devices with respect to changes in the context. Similarly, if an additional device, or group of devices, becomes available, the analyzer component 306 can automatically consider the additional device(s) with respect to the context as well as the presently available devices. Upon completing the dynamic analysis, the chosen (e.g., activated, pooled) devices can be updated. Examples of this functionality will be detailed infra in order to provide perspective to the invention. It is to be understood that the examples are provided to outline the novel functionality of the subject system and/or methodology and are not to be deemed limiting in any way.

Figure 4:
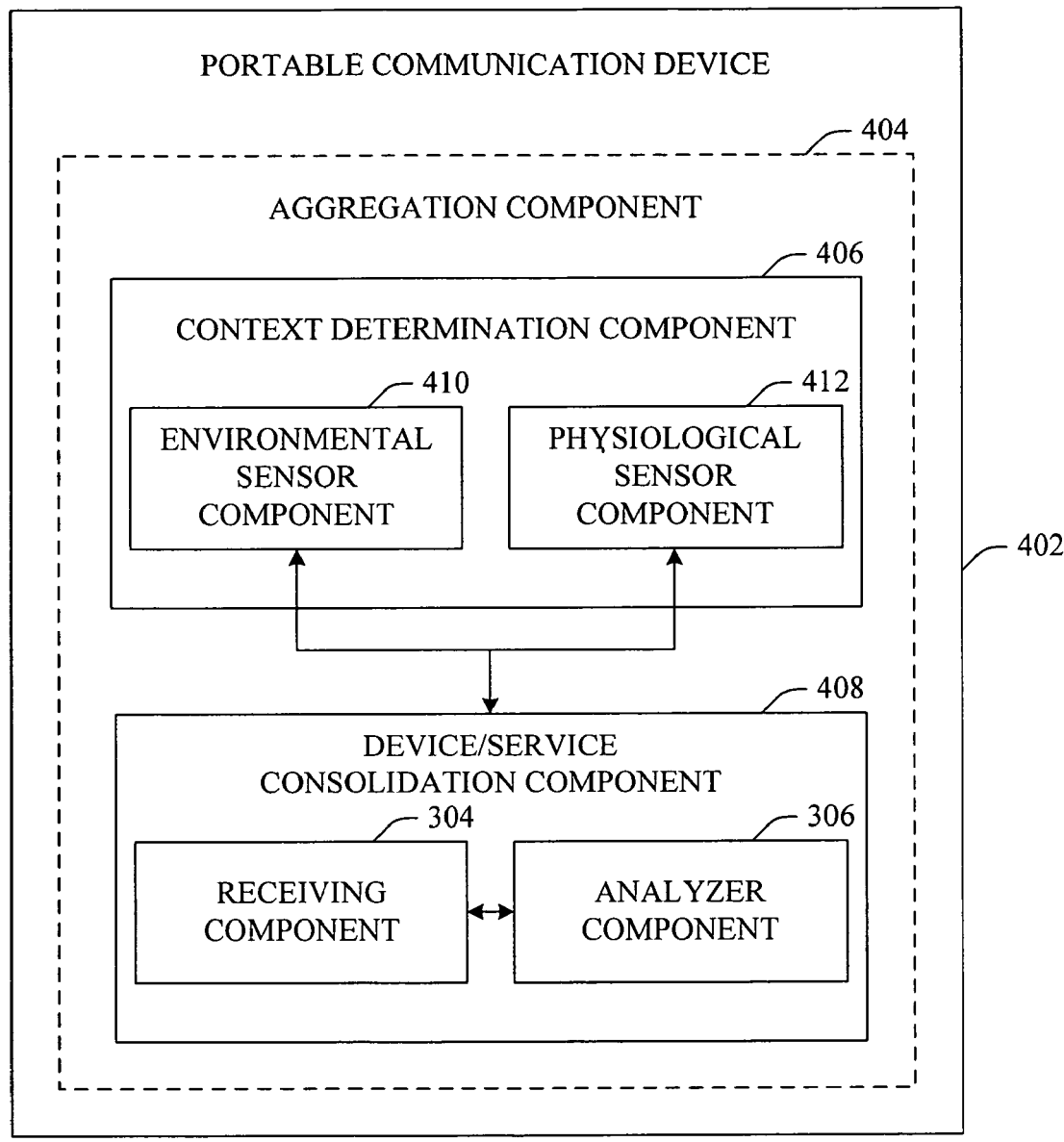
FIG. 4 illustrates a block diagram of a portable communications device that employs an environmental sensor and a physiological sensor to determine a context in accordance with an aspect of the novel subject matter.

FIG. 4 illustrates yet another aspect of the novel functionality of the claimed subject matter. More particularly, FIG. 4 illustrates a portable communication device 402 that employs an aggregation component 404 to automatically join and/or disjoin disparate devices in accordance with a context. The aggregation component 404 can include a context determination component 406 and a device/service consolidation component 408.

In contrast to the systems of FIGS. 1 and 3, the context determination component 406 can internally include sensors that facilitate establishment of a context. As such, the context determination component 406 can include an environmental sensor component 410 and a physiological sensor component 412.

For example, the portable communications device 402, via the context determination component 406, can employ the sensor(s) 410, 412 to determine factors relevant to determining a desired and/or appropriate context. By way of more specific example, the context determination component 406 can determine a current physical location of a user together with a measure of acceleration (e.g., via accelerometer) thus a determination can be made, via device/service consolidation component 408) which, if any, compatible devices should be aggregated with respect to the given user state.

Similarly, if the determination is made that the location is stable for some predetermined amount of time, the device/service consolidation component 408 can be employed to disaggregate the accelerometer device as it would no longer be necessary for the measurement of motion. It will be appreciated that this novel aggregation/disaggregation can be particularly useful to optimize the level of functionality with respect to a user's state. As such, performance, efficiency, memory use and power conservation can be enhanced by monitoring the particular context and aggregating and/or disaggregating devices accordingly.

Figure 5:
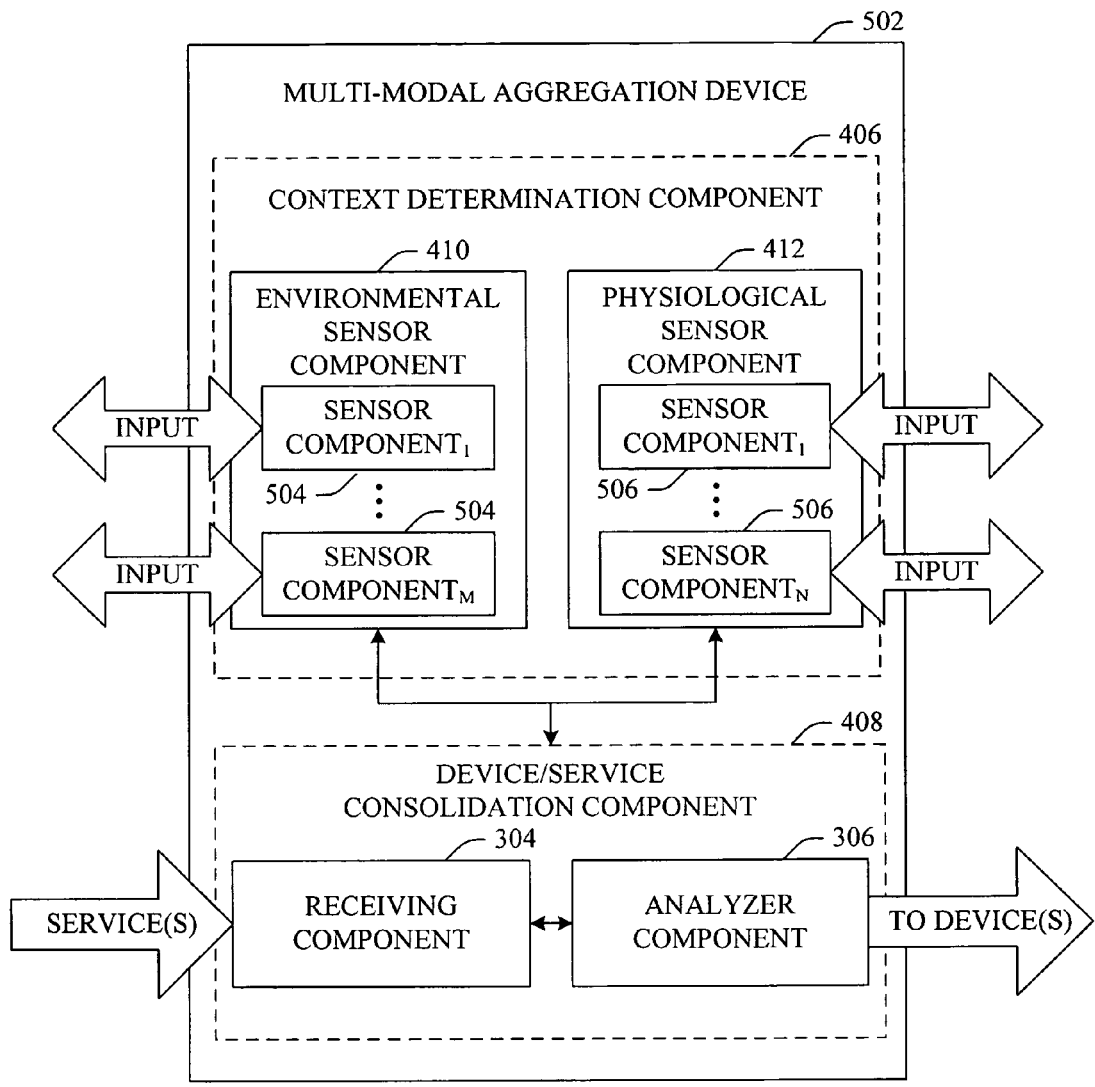
FIG. 5 illustrates a block diagram of a system that employs multiple sensors to establish a context in accordance with an aspect of the innovation.

Turning now to FIG. 5, a multi-modal aggregation device 502 that facilitates joining and disjoining disparate devices based upon a context is shown. Generally, multi-modal aggregation device 502 includes a context determination component 406 and a device/service consolidation component 408. As described supra, the context determination component 406 can include an environmental sensor component 410 and a physiological sensor component 412.

As illustrated, environmental sensor component 410 can include 1 to M sensor components, where M is an integer. It is to be understood that 1 to M sensor components can be referred to individually or collectively as sensor components 504. Similarly, physiological sensor component 412 can include 1 to N sensor components, where N is an integer. Moreover, it is to be understood and appreciated that 1 to N sensor components can be referred to individually or collectively as sensor component(s) 506.

In operation, these sensor components 504, 506 can be employed to establish a user context. More particularly, these sensor components 504, 506 can be employed to establish contextual factors including a user state, environmental conditions, location, temporal factors or the like. This contextual information can be input into the receiving component 304 of the device/service consolidation component 408. Accordingly, the analyzer component 306 can be employed to designate appropriate devices/services to activate/deactivate in accordance with the context. To this end, the consolidated (e.g., pooled) devices/services can provide an enhanced functionality to the user in accordance with a specific context. Likewise, in the event that the context changes, the multi-modal aggregation device can deconsolidate redundant and/or unnecessary devices/services.

Figure 6:
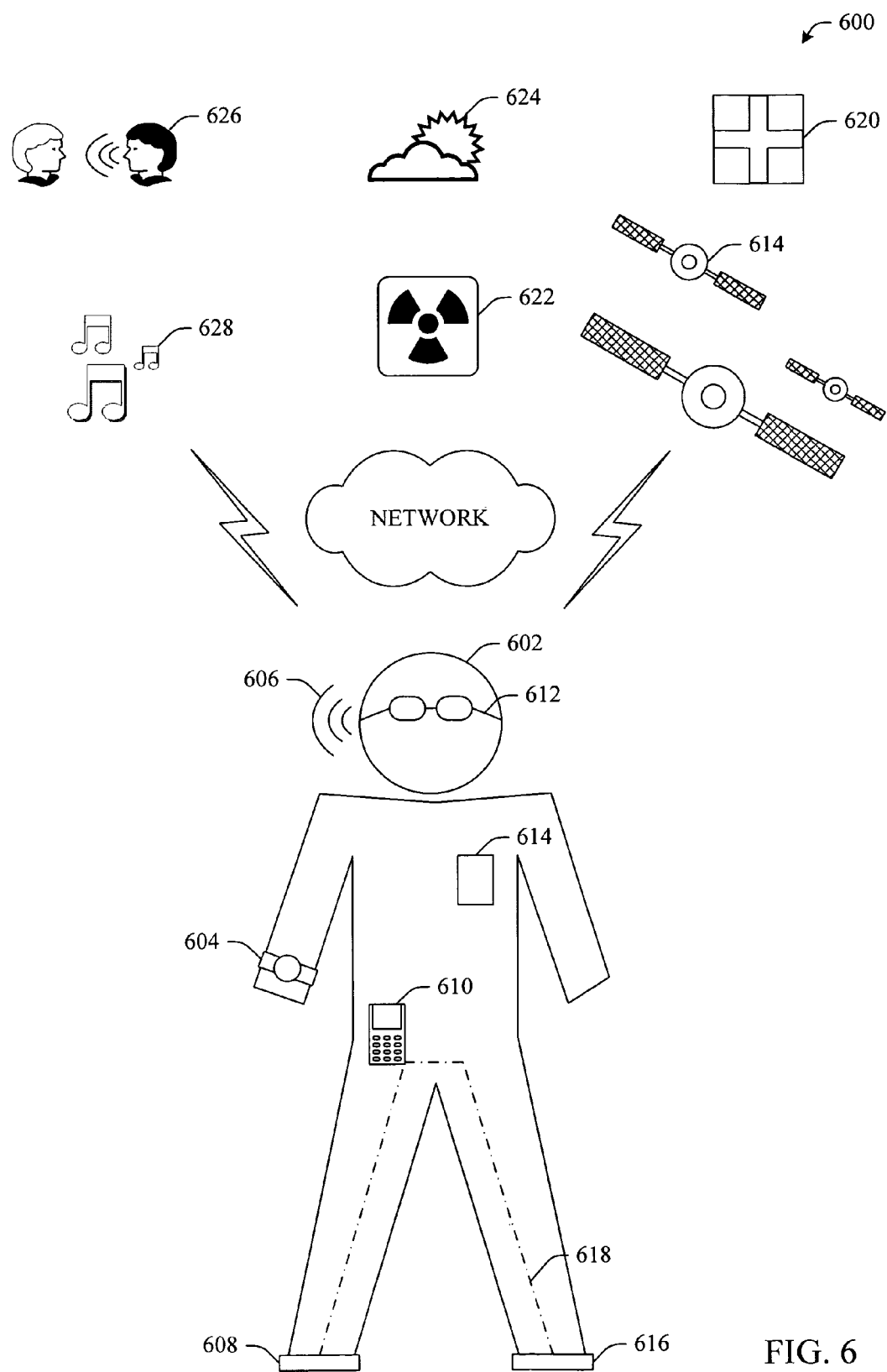
FIG. 6 illustrates a graphical representation of an individual having multiple sensors and multiple devices associated therewith in accordance with an aspect of the subject innovation.

Referring now to FIG. 6, specific scenarios are illustrated with regard to the novel functionality of the invention. It is to be understood that the scenarios described with reference to FIG. 6 are provided to illustrate the novel functionality of the aggregation system(s) and methods provided herein. As such, it should be understood that these exemplary scenarios are not intended to limit the scope of this disclosure and claims appended hereto in any way. Rather, it is to be understood that these and other scenarios exist that employ the novel functionality of aggregating and disaggregating devices based upon a context (e.g., user state, environmental conditions, location, temporal factors). Although the scenarios described infra with reference to FIG. 6 are related to a user context, it is to be appreciated that these and other aspects can be applied to a context-aware device generally and not directly related to a user per se.

Generally, FIG. 6 illustrates a system 600 that facilitates aggregating (e.g., pooling, joining) and disaggregating devices based upon a context. As shown in FIG. 6, a user 602 can employ various devices situated in disparate locations based upon a specific situation context. In other words, the circumstances or events that form the environment within which something exists or takes place can be employed to join and/or disjoin devices (or services).

By way of example, user 602 can employ a watch 604, an earphone 606, a power source (e.g., batteries in shoes) 608, a cellular telephone 610 (with or without personal data assistant (PDA) functionality, sunglasses 612 (which can also be equipped with a digital music download/playing capability), an embedded global position system 614, an accelerometer 616, an image capture device (e.g., incorporated into cellular telephone 610), wired attire 618, etc.

In accordance with aspects of the subject system and/or methodology these devices 604-618 can work autonomously and/or in conjunction with a subset of the other devices to provide for a highly rich multi-modal user experience. As described supra, the system can employ environmental and/or physiological sensors to determine a context of a particular situation by which the devices 604-618 can be aggregated or disaggregated accordingly.

The system 600 can employ physiological sensors to measure and/or monitor bodily statistics and criteria (e.g., pulse, blood pressure, temperature). These physiological sensors can assist in determining if a user is in need of medical or emergency attention as illustrated by icon 620. As well, these sensors can be employed together with environmental sensors to determine if a user is located in a hazardous location (e.g., radioactive restrictive area 622). Additionally, environmental sensors can be employed to determine additional factors that can contribute to a user state and/or context. For example, satellites (e.g., GPS 614) can be employed to determine a user and/or device location.

In still other examples, the system can determine weather conditions 624 by employing physiological sensors. Detection of audible sounds such as spoken conversation 626 and music 628 can be employed to assist in the establishment of a user context. As described above, once a user context has been established, the system can aggregate and disaggregate devices based upon the context in order to provide an enhanced user experience. In other words, the system can facilitate combining (and/or disconnecting) any number of context-aware devices thereby creating a multi-modal user experience. In a specific example, the system can, based upon an established context, automatically employ a digital music device to download digital music from a detected source(s).

As described above, the aggregation/disaggregation functionality of the subject system can be integral to each device, a subset of the devices or all of the devices as desired. For instance, in an example, one device (e.g., multi-modal aggregation device) can act as a master thereby controlling activation and use of individual disparate devices. In another example, each device can be equipped with logic and/or reasoning mechanisms thus enabling the devices to work in conjunction thereby deciding, based upon the context, if the device is needed and/or should be aggregated.

Figure 7:
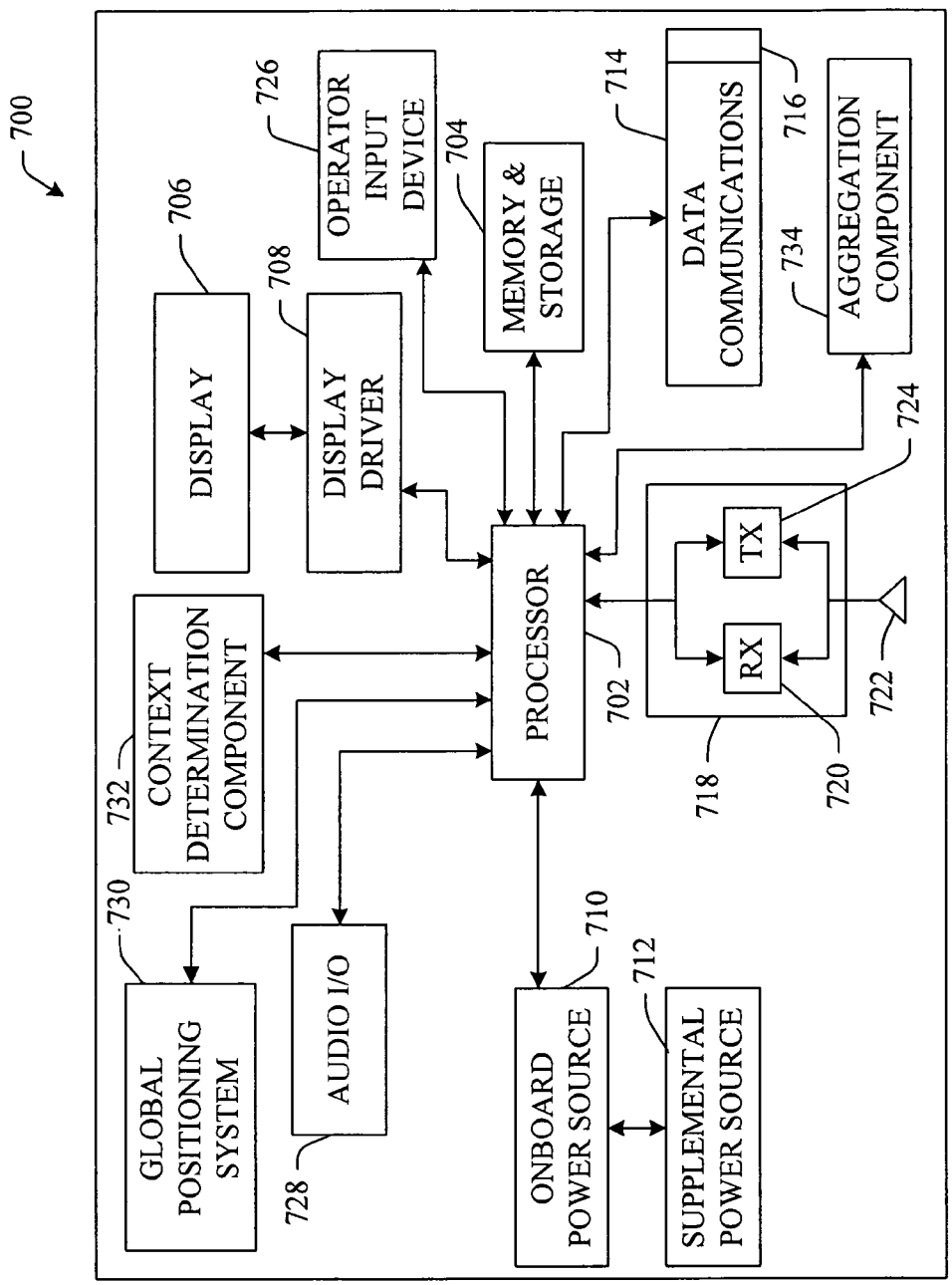
FIG. 7 illustrates an architecture of a multi-modal portable communication device that facilitates automatically aggregating and/or disaggregating a device(s) in accordance with an aspect.

Referring now to FIG. 7, there is illustrated a schematic block diagram of a portable multi-modal multi-lingual handheld device 700 according to one aspect of the subject invention, in which a processor 702 is responsible for controlling the general operation of the device 700. The processor 702 can be programmed to control and operate the various components within the device 700 in order to carry out the various novel analysis functions described herein. The processor 702 can be any of a plurality of suitable processors. The manner in which the processor 702 can be programmed to carry out the functions relating to the subject invention will be readily apparent to those having ordinary skill in the art based on the description provided herein.

A memory and storage component 704 connected to the processor 702 serves to store program code executed by the processor 702, and also serves as a storage means for storing information such as sensor inputs, PIM data, context data, user/device states or the like. The memory and storage component 704 can be a non-volatile memory suitably adapted to store at least a complete set of the information that is acquired. Thus, the memory 704 can include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of gathered information.

A display 706 is coupled to the processor 702 via a display driver system 708. The display 706 can be a color liquid crystal display (LCD), plasma display, touch screen display, 3-dimensional (3D) display or the like. In one example, the display 706 is a touch screen display. The display 706 functions to present data, graphics, or other information content. Additionally, the display 706 can render a variety of functions that are user selectable and that control the execution of the device 700. For example, in a touch screen example, the display 706 can render touch selection icons that facilitate user interaction for control and/or configuration of aggregated and/or disaggregated devices. In another aspect, display 706 is a 3D display that can augment and enhance visual qualities thereby making the visuals more true to form.

Power can be provided to the processor 702 and other components forming the hand-held device 700 by an onboard power system 710 (e.g., a battery pack or fuel cell). In the event that the power system 710 fails or becomes disconnected from the device 700, a supplemental power source 712 can be employed to provide power to the processor 702 (and other components (e.g., sensors, image capture device, . . . )) and to charge the onboard power system 710, if a chargeable technology. For example, the alternative power source 712 can facilitate an interface to an external grid connection via a power converter (not shown). The processor 702 of the device 700 can induce a sleep mode to reduce the current draw upon detection of an anticipated power failure.

The device 700 includes a communication subsystem 714 that includes a data communication port 716, which is employed to interface the processor 702 with a disparate multi-modal device, remote computer, server, service, or the like. The port 716 can include at least one of Universal Serial Bus (USB) and/or IEEE 1394 serial communications capabilities. Other technologies can also be included, but are not limited to, for example, infrared communication utilizing an infrared data port, Bluetooth™, Wi-Fi, Wi-Max, etc.

The device 700 can also include a radio frequency (RF) transceiver section 718 in operative communication with the processor 702. The RF section 718 includes an RF receiver 720, which receives RF signals from a remote device via an antenna 722 and can demodulate the signal to obtain digital information modulated therein. The RF section 718 also includes an RF transmitter 724 for transmitting information (e.g., data, services) to a remote device, for example, in response to manual user input via a user input (e.g., a keypad, voice activation) 726, or automatically in response to the completion of a location determination or other predetermined and programmed criteria.

The transceiver section 718 can facilitate communication with a transponder system, for example, either passive or active, that is in use with location-based data and/or service provider components. The processor 702 signals (or pulses) the remote transponder system via the transceiver 718, and detects the return signal in order to read the contents of the detected information. In one implementation, the RF section 718 further facilitates telephone communications using the device 700. In furtherance thereof, an audio I/O subsystem 728 is provided and controlled by the processor 702 to process voice input from a microphone (or similar audio input device). The audio I/O subsystem 728 and audio output signals (from a speaker or similar audio output device). A translator component or multi-language component (not shown) can further be provided to enable multi-lingual/multi-language functionality of the device 700.

The device 700 can employ a global position engine 730 which can generate location context information. This location context information can be combined by processor 702 with other contextual information (e.g., user state, environmental, temporal factors) provided via a context determination component 732 thus prompting an aggregation and/or disaggregation by the aggregation component 734 in accordance with the context and as described in greater detail supra.

Figure 8:
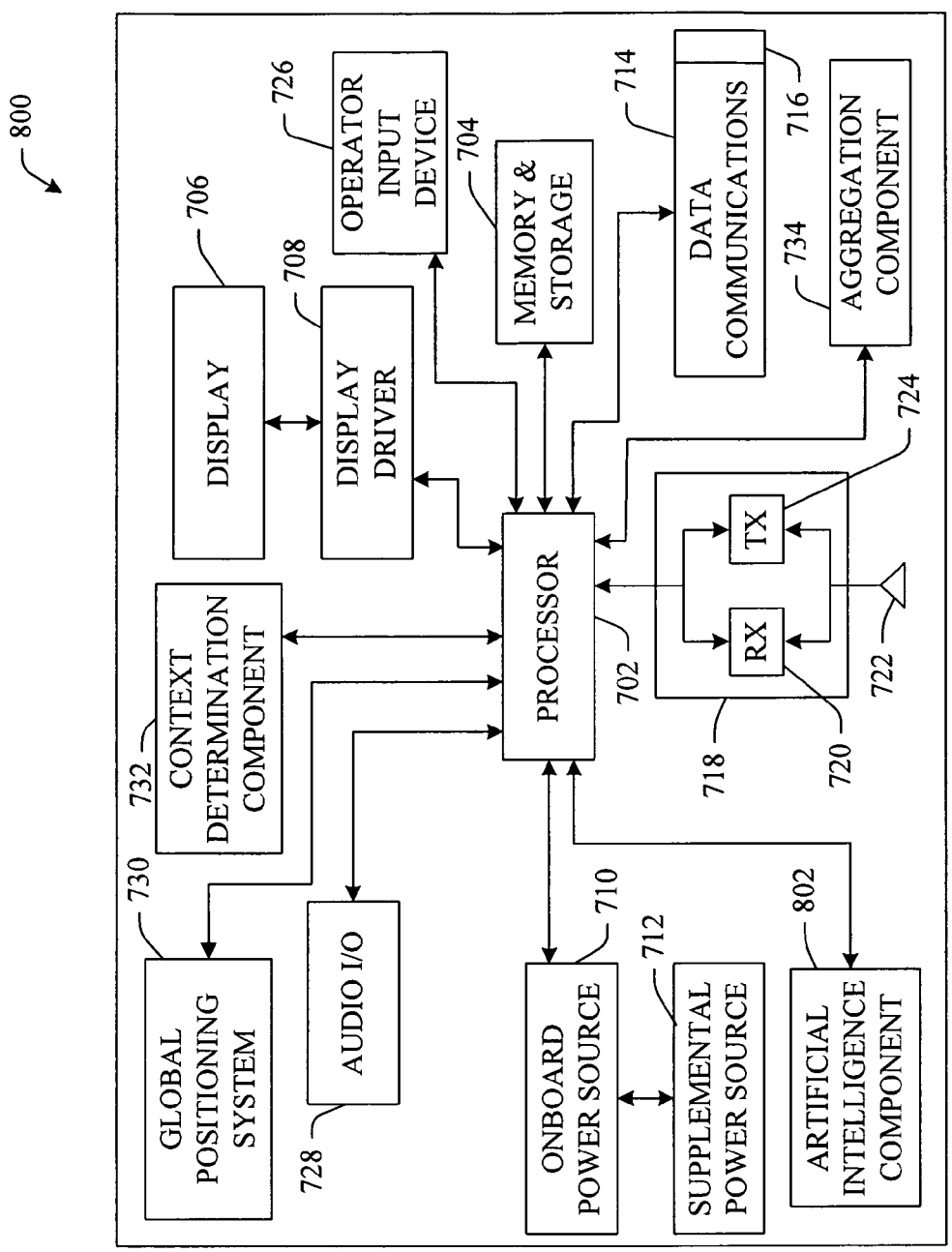
FIG. 8 illustrates an architecture of a portable handheld device including an artificial intelligence reasoning component that can automate functionality in accordance with an aspect of the aggregation system.

FIG. 8 illustrates a system 800 that employs artificial intelligence (AI) component 802 which facilitates automating one or more features in accordance with the subject invention. The subject invention (e.g., with respect to automatically aggregating/disaggregating devices, predicting a context, . . . ) can employ various AI-based schemes for carrying out various aspects thereof. For example, probabilistic and/or statistical-based analysis can be employed to effect inferring a user intention and/or preference with respect to an inferred context.

The subject invention (e.g., context determination, device/service aggregation/disaggregation) can employ various AI-based schemes for carrying out various aspects thereof. For example, a process for determining when to aggregate and/or disaggregate devices/services can be facilitated via an automatic classifier system and process. Moreover, where multiple and/or similar devices are available from disparate locations, the classifier can be employed to determine which device from which location will be selected for aggregation.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when/if to aggregate a device or group of devices, when/if to disaggregate a device or group of devices, what a specific context will be, etc. The criteria can include, but is not limited to, the type of device(s), the location of the device, time of day/week/year, number of devices, etc.

Figure 9:
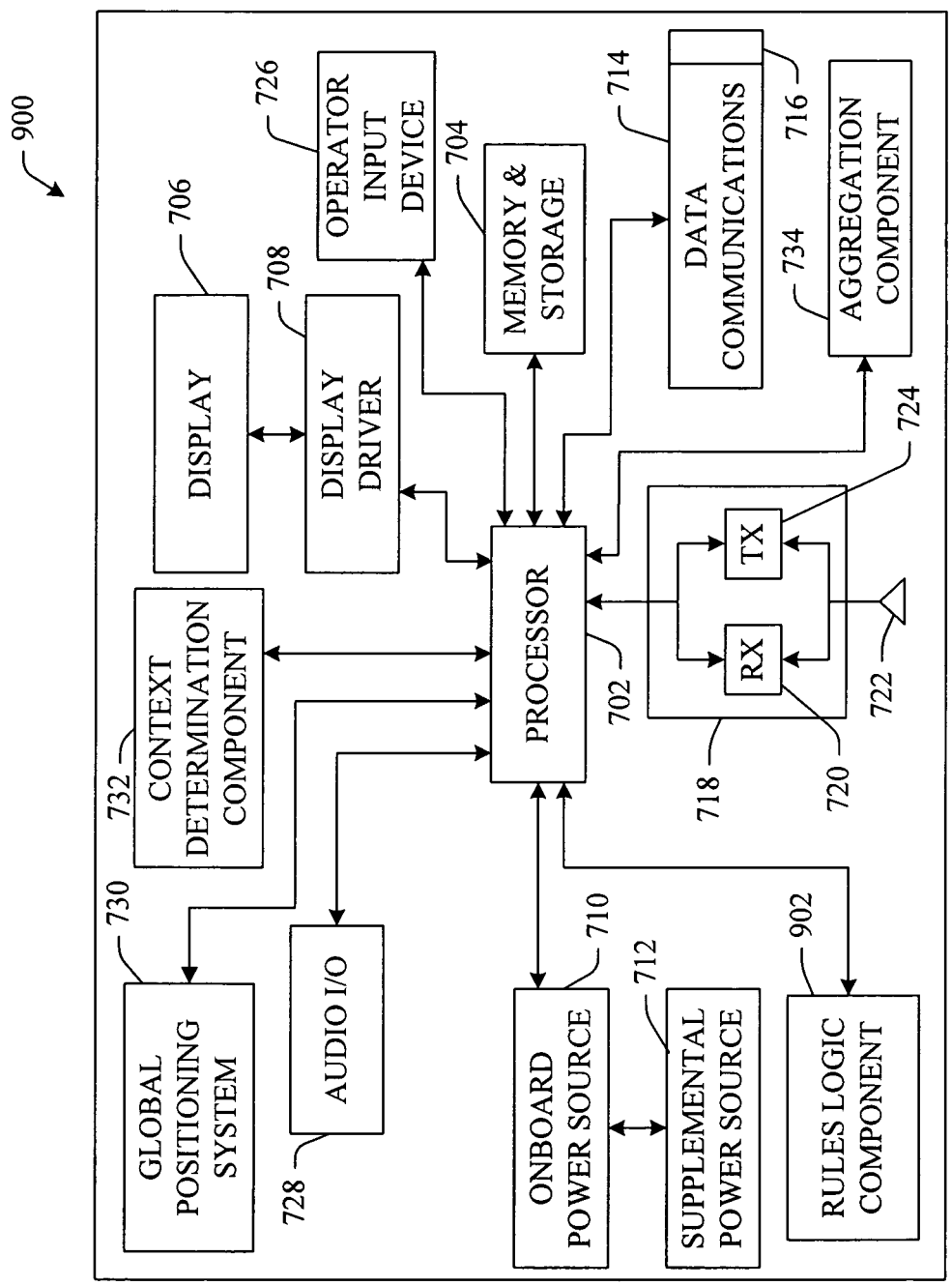
FIG. 9 illustrates an architecture of a portable handheld device including a rules-based logic component that can automate functionality in accordance with an aspect of the innovation.

With reference now to FIG. 9, an alternate aspect of the invention is shown. More particularly, handheld device 900 generally includes a rules-based logic component 902. In accordance with this alternate aspect, an implementation scheme (e.g., rule) can be applied to define acceptable probabilities, determine aggregation/disaggregation, etc.

By way of example, it will be appreciated that the rules-based implementation of FIG. 9 can automatically determine which devices to aggregate and/or disaggregate based upon a predetermined criteria. It is to be appreciated that any of the specifications and/or functionality utilized in accordance with the subject invention can be programmed into a rule-based implementation scheme. It is also to be appreciated that this rules-based logic can be employed in addition to, or in place of, the AI reasoning techniques described with reference to FIG. 8.

Figure 10:
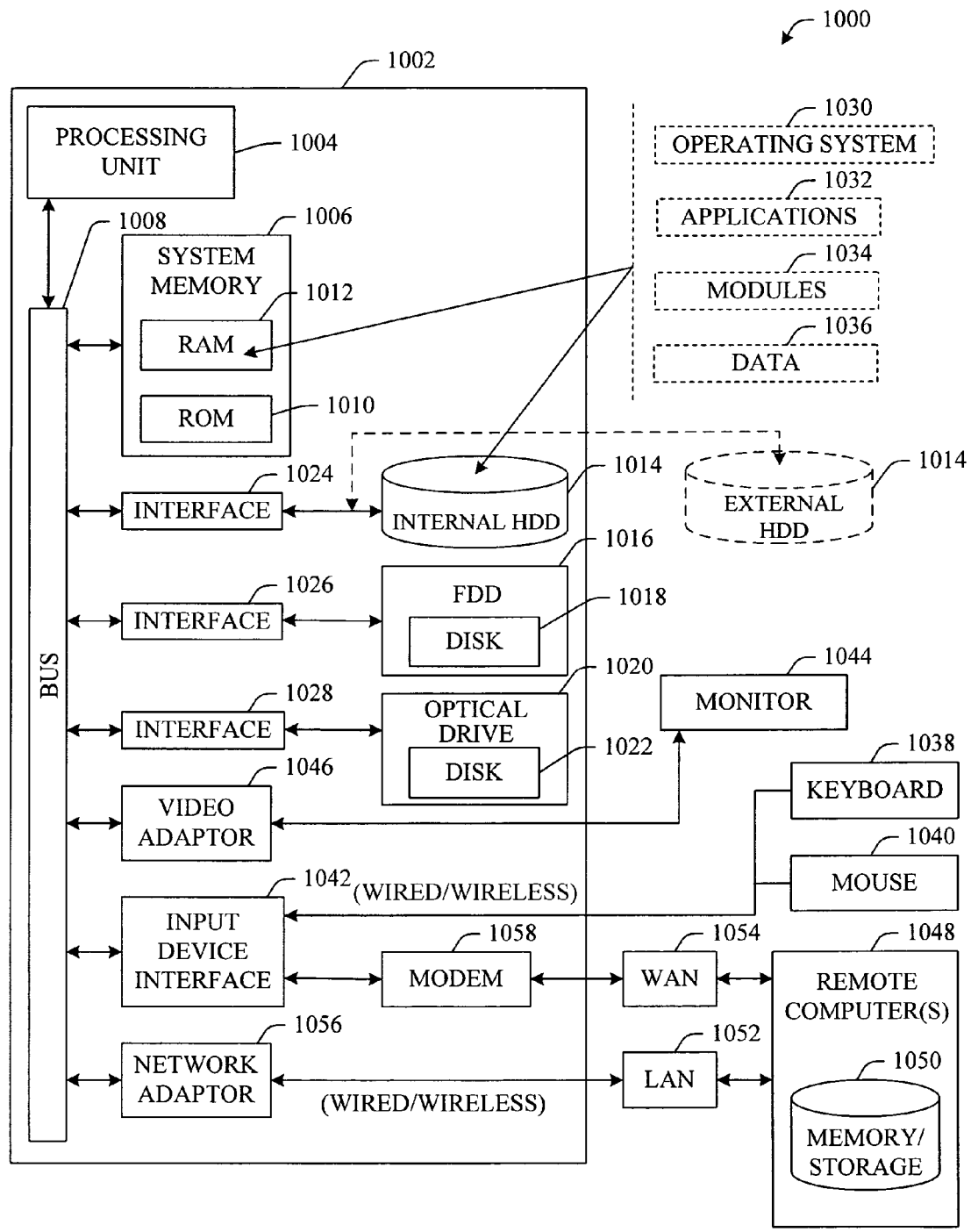
FIG. 10 illustrates a block diagram of a computer operable to execute the disclosed architecture.

Referring now to FIG. 10, there is illustrated a block diagram of a computer operable to execute the disclosed architecture of aggregating and/or disaggregating multi-modal devices. In order to provide additional context for various aspects of the subject invention, FIG. 10 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 11:
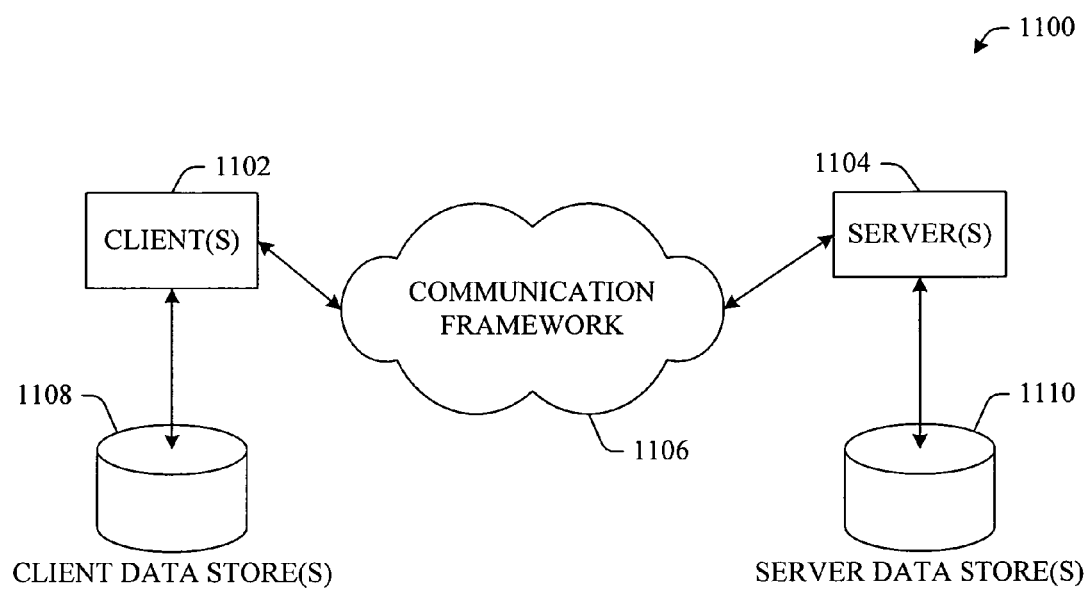
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject invention. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates pooling a plurality of resources, comprising:
    a context determination component that employs data derived from a plurality of sensors and an artificial intelligence scheme to dynamically infer a context of a user; and
    a consolidation component that determines availability of a set of disparate devices, selects a subset of the disparate devices, and aggregates data from the subset of disparate devices, selection and aggregation based at least in part upon the context of a user.

2. The system of claim 1, the consolidation component disaggregates selected data from the subset of disparate devices based at least in part on a change in the context of the user.

3. The system of claim 1 wherein each of the plurality of sensors is at least one of an environmental sensor or a physiological sensor.

4. The system of claim 1, the consolidation component comprises:
    a receiving component that accepts an input from the plurality of resources; and
    an analyzer component that, based upon the context, determines and pools a subset of the plurality of resources.

5. The system of claim 4, the context includes at least one of a user state context, an environmental context, a location context or a temporal context.

6. The system of claim 4, the subset of the disparate devices includes at least one of a watch, an earphone, a power source, a cellular communication device, sunglasses, a global position system (GPS) engine, an image capture device or a wired attire.

7. The system of claim 4, the subset of the plurality of resources automates an action the user desires to be performed.

8. The system of claim 7, further comprising an artificial intelligence (AI) component that infers the action that the user desires to be automatically performed.

9. The system of claim 7, further comprising a rules-based logic component that defines the action that the user desires to be automatically performed.

10. The system of claim 6, the action is an authentication action.

11. The system of claim 6, the action is an automatic download of digital music content.

12. A computer-implemented method for providing an optimized level of functionality, comprising:

inferring a context of a user;
determining availability of a set of disparate devices;
selecting a first subset of the available disparate devices to be aggregated given the inferred context;
aggregating data from the first subset of devices based at least in part upond the context;
detecting addition of a new device to the set of disparate devices; and
analyzing the new device with respect to the context to determine whether the new device is to be aggregated with the first subset of devices.

13. The computer-implemented method of claim 12, further comprising disaggregating a second subset of the plurality of devices based at least in part upon a change in the context associated with the user.

14. The computer-implemented method of claim 13, the context is at least one of a user state context, an environmental context, a location contexts or a temporal context.

15. The computer-implemented method of claim 14, the plurality of devices includes at least one of a watch, a listening device, a power source, a cellular telephone, a GPS engine, an accelerometer, a personal data assistant or an image capture device.

16. The computer-implemented method of claim 15, further comprising automating an action the user desires to be performed using the first subset of devices.

17. A computer-readable medium having computer executable instructions that facilitates aggregating a plurality of resources, comprising:
means for dynamically inferring a user context using data derived from a plurality of sensors;
means for determining availability of a set of disparate devices having associated resources;
means for selecting a first subset of the available disparate devices appropriate to the inferred context;
means for automatically aggregating data from the first subset of devices based at least in part upon the user context; and
means for disaggregating a second subset of the available devices based at least in part upon a change in the user context.

18. The computer executable system of claim 17, the means for dynamically inferring a user context includes at least one of an environmental sensor or a physiological sensor.

19. The computer executable system of claim 18, the set of devices located at a plurality of disparate locations.

20. The computer executable system of claim 19, further aomprising means for automating an action a user desires to be performed using the first subset of devices.

* * * * *